United States Patent [19]
Liebert

[11] 4,071,430
[45] Jan. 31, 1978

[54] ELECTROPHORETIC IMAGE DISPLAY HAVING AN IMPROVED SWITCHING TIME

[75] Inventor: Richard B. Liebert, Ridgefield, Conn.

[73] Assignee: North American Philips Corporation, New York, N.Y.

[21] Appl. No.: 747,559

[22] Filed: Dec. 6, 1976

[51] Int. Cl.² .................... G03G 15/00; C25D 13/00
[52] U.S. Cl. ................... 204/299 R; 96/1 A; 204/180 R; 204/181 R; 350/160 R
[58] Field of Search ......... 204/180 R, 180 P, 299 PE, 204/299 R, 299 EC, 300, 181; 96/1 A; 252/62.16; 355/3 R; 357/73, 60

[56] References Cited
U.S. PATENT DOCUMENTS

| | | | |
|---|---|---|---|
| 3,145,156 | 8/1964 | Oster | 204/299 PE |
| 3,649,514 | 3/1972 | Rosenberg | 204/299 PE |
| 3,668,106 | 6/1972 | Ota | 204/299 PE |
| 3,674,475 | 7/1972 | Silverberg | 204/299 PE X |
| 3,689,399 | 9/1972 | Ota | 204/181 PE X |
| 3,756,693 | 9/1973 | Ota | 204/299 PE X |
| 3,812,406 | 5/1974 | Henri | 357/73 |
| 3,890,039 | 6/1975 | Cantarano | 355/3 R |
| 3,914,040 | 10/1975 | McVeigh | 355/3 R |
| 3,936,172 | 2/1976 | McVeigh | 355/3 R |

*Primary Examiner*—Arthur C. Prescott
*Attorney, Agent, or Firm*—Frank R. Trifari; Norman N. Spain

[57] ABSTRACT

An electrophoretic visual display device using an electrophoretic suspension with pigment particles in a dielectric suspending liquid and a dye for contrasting color, all enclosed in a unit comprising a transparent electrode spaced from at least one segmented electrode by an insulating member; a mesh electrode in the shape of the segmented electrode having holes barely visible to the naked eye is positioned on the transparent layer between the layer and the segmented electrode.

6 Claims, 1 Drawing Figure

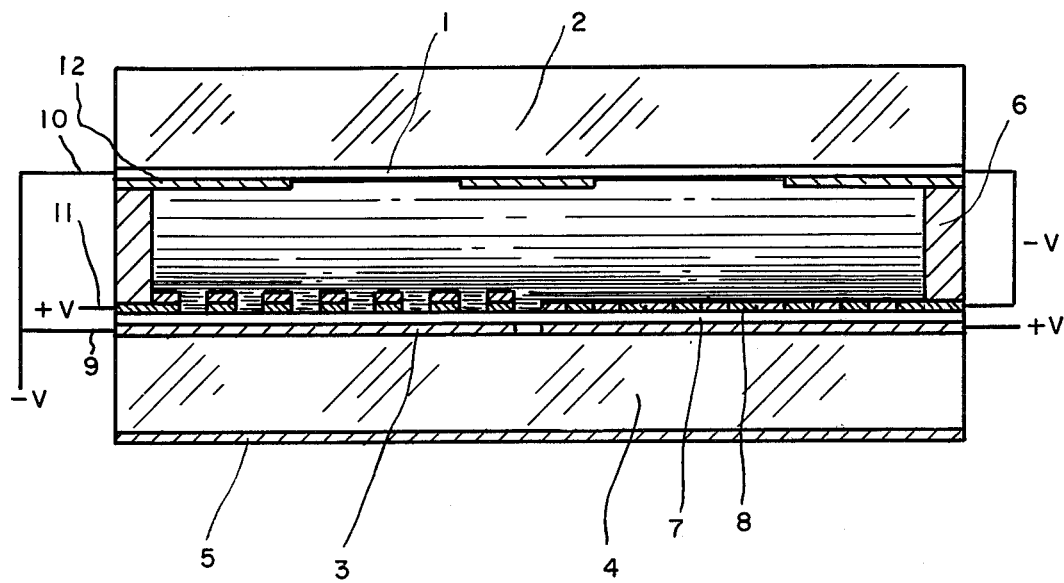

ELECTROPHORETIC IMAGE DISPLAY HAVING AN IMPROVED SWITCHING TIME

BACKGROUND OF THE INVENTION

Electrophoretic image display cells, hereinafter termed EPID cells, have been described in the art, for example in Evans, U.S. Pat. No. 3,612,758 and Ota, U.S. Pat. No. 3,668,106.

Generally, an EPID cell comprises firstly a dispersion of pigment particles in a dielectric liquid suspending medium to which is added a dye to cause the dispersion medium to have a contrasting color to that of the pigment particles and a charging material for introducing a charge on the pigment particles.

The dispersion is contained in a cell formed by two closely spaced electrodes joined together by a thin section of insulating material. One of the electrodes, the front or viewing electrode is transparent and the rear electrode, which is made to conform to the desired image or images desired to be displayed, may or may not be transparent.

An electric field is created across the suspension by means of a D.C. voltage applied to the front and rear electrodes.

Depending upon the charge on the pigment particles and the electrodes, the pigment particles are attracted to either the front or rear electrode.

If the pigment particles are negative, the front electrode is positive and the rear electrode is negative the pigment particles are attracted to the front electrode in the shape of the rear electrode. The observer sees an image of the color of the pigment against the color of the dispersion medium. Reversal of the polarity between the electrodes causes a reversal in the colors of the image and background.

Removal of the electric field does not cause disruption of the image, as the pigment particles remain in the previously activated position for a period of time. Thus the cell exhibits some memory function.

One problem with the known EPID cells is that they have relatively slow switching times, that is, the time it takes pigment particles to move from the front to the rear electrodes or the reverse. The relationship of the switching time to the applied voltage and distance between the electrodes is determined according to the formula $$t = 6 \pi d^2 \eta / V \epsilon \zeta$$

where $t$ is the switching time, $d$ is the distance between the front and rear electrodes, $\epsilon$ is the dielectric constant and $\eta$ is the viscosity of the suspending medium $\zeta$ is the zeta potential and $V$ is the applied voltage.

As can be seen, the switching time is largely dependent on the distance between the electrodes as it increases with the square of this distance.

Due to practical considerations, there is a minimum limit on the distance between the electrodes and thus the minimum switching time for a given potential difference is limited for a particular suspension.

For many purposes a faster switching time then is achieved with the presently known EPID cells is highly desirable.

An additional problem is the need for use of dyes in order to hide the pigment when it is on the rear electrode.

GENERAL DESCRIPTION OF THE INVENTION

A principal object of the invention is to provide novel EPID cells having faster switching times than those of the prior art.

Another principal object of the invention is to provide an EPID cell capable of operating at a reduced voltage.

Still another object of the invention is to provide an EPID cell wherein the suspension is free of dyes.

These and other objects of the invention will be apparent from the description that follows:

According to the invention, an EPID cell of unique construction is provided in which the rear electrode is not in contact with the electrophoretic suspension but is separated from the suspension by a mesh electrode having holes and spacings barely visible to the naked eye in contact with the dispersion and separated from the rear electrode by a transparent insulating layer. In this EPID cell at least the mesh electrode or the rear electrode is reflective.

The operation of the EPID cell of the invention is as follows:

Employing a reflective mesh electrode and a black negatively charged pigment suspended in a clear liquid, with the rear and front electrodes negative in relation to the mesh electrode, all the pigment is deposited on the mesh electrode and the observer looking through the transparent front electrode sees only black, since the spaces within the mesh are made to look black.

When the charge on the mesh electrode and the back electrode are reversed, the pigment is deposited in the mesh holes and the observer sees the exposed reflective metal of the mesh.

Due to the fact that the pigment must travel only between the mesh metal and the holes in the mesh to cause switching rather than the much longer distance between the front and rear electrodes, switching time is greatly reduced in the EPID cells of the invention.

Similarly the voltage required to operate the cell is greatly reduced since the pigment only has to travel a much smaller distance for switching to occur.

DETAILED DESCRIPTION OF THE INVENTION

The invention will now be described in greater detail with reference to the drawing, the sole FIGURE of which is a cross-sectional view of an EPID cell of the invention.

Referring to the drawing, front transparent electrode 1 such as indium oxide having a thickness of about 1000 A supported by transparent substrate 2 such as glass or methyl methacrylate resin is opposed by rear transparent electrode 3 such as indium oxide which has a thickness of about 1000 A.

Rear electrode 3 is supported by transparent substrate 4 which may be made of glass or another suitable non-conducting transparent material. The rear surfaces of substrate 4 is colored black by means of a black paint layer 5.

The front and rear electrode 1 and 3 are separated from each other by a 50 μm thick epoxy resin seal 6.

On the surface of rear electrode 3, facing front electrode 1, is a thin transparent dielectric layer 7 formed of a photoresist such as AZ 1350J made by Shipley Co. and 5000 A thick. The surface of the dielectric layer 7 facing the front electrode 1 is covered with a thin reflective metal mesh 8 of reflective aluminum or other metal. The mesh 8 has holes of 8 μ diameter on 19 μ centers. An opaque mask 10 formed of a thin black paint layer is present on the surface of the front electrode 1 opposing rear electrode 3.

The metal mesh 8 is formed by evaporating a thin layer of aluminum on the dielectric layer 7 and then etching the aluminum layer with an etch such as phosphoric and nitric acids through a photoresist mask to provide the holes in the aluminum layer and the resultant mesh 8.

An electrophoretic suspension comprising a mixture of perchloroethylene and xylene in a volume ratio of 7 to 3 to which there is added two percent by weight of diarylide yellow pigment one percent by weight of Chevron OLOA-370 to stabilize the dispersion and charge the pigment was injected into the cell and the resultant hole was sealed. D. C. voltages were applied through lead lines 9, 10 and 11 to the rear, front and mesh electrodes respectively.

Application of −100 volts to the mesh electrode 8 and the front electrode 1 with respect to ground (rear electrode 3) resulted in the negatively charged pigment being mostly in the mesh holes allowing the reflective surface of the mesh electrode 8 to be visible through front electrode 1. Reversing the polarity between electrodes 8 and 3 so that the front electrode 1 and rear electrode 3 were at −100 volts and mesh electrode 8 was at ground most of the pigment particles covered the aluminum surface of the mesh electrode 8 thus destroying the visibility of this electrode through the front electrode 1. Repeated changes in polarity between electrodes 3 and 8 resulted in repeated changes of reflectivity of the mesh electrode 8.

The device operated successfuly with voltage as low as −20 volts.

What is claimed is:

1. An electrophoretic visual display device comprising:

an electrophoretic suspension comprising a dispersion of pigment particles in a dielectric suspending liquid, a dye adapted to provide the suspending liquid with a color contrasting to that of the pigment particles and a charging material for introducing a charge on the pigment particles;

a first transparent electrode;

at least one segmented electrode having a major surface in opposition to the major surface of said first transparent electrode and spaced therefrom by at least one thin insulating member, said electrodes and said thin insulation members forming a cell for containing said electrophoretic suspension;

a transparent insulating layer positioned on the major surface of said segmented electrode opposed to said first transparent electrode;

a mesh electrode in the shape of the segment electrode having holes barely visible to the naked eye positioned on said transparent insulating layer between said segmented electrode and said transparent insulating layer; one of said mesh electrode and said segmented electrode being formed of light reflective metal and voltage supply means for supplying a reversible electric field between said mesh electrode and said segmented electrode.

2. The device of claim 1 wherein the mesh electrode is formed of a light reflective metal.

3. The electrophoretic visual display device of claim 2 wherein the first transparent electrode is a thin coating of a transparent electrically conductive material on the surface of a transparent electrically insulating substrate.

4. The electrophoretic display device of claim 3 wherein the segmented electrode is transparent.

5. The electrophoretic device of claim 1 wherein the segmented electrode is supported by a transparent electrically insulating substrate.

6. The electrophoretic visual display device of claim 3 wherein the reflective mesh electrode is formed of aluminum.

* * * * *